(No Model.)

W. E. HATHEWAY.
CLASP.

No. 598,090. Patented Feb. 1, 1898.

WITNESSES:
A. D. Harrison
P. W. Pezzetti

INVENTOR:
W. E. Hatheway
by Wright Brown & Quimby
attys.

THE NORRIS PETERS CO., PHOTO-LITHO., WASHINGTON, D. C.

UNITED STATES PATENT OFFICE.

WILLIAM E. HATHEWAY, OF BRIDGEPORT, CONNECTICUT, ASSIGNOR TO THE WELD MANUFACTURING COMPANY, OF BOSTON, MASSACHUSETTS.

CLASP.

SPECIFICATION forming part of Letters Patent No. 598,090, dated February 1, 1898.

Application filed April 8, 1897. Serial No. 631,256. (No model.)

*To all whom it may concern:*

Be it known that I, WILLIAM E. HATHEWAY, of Bridgeport, in the county of Fairfield and State of Connecticut, have invented certain new and useful Improvements in Clasps, of which the following is a specification.

This invention relates to an appliance such as a corset-steel, which comprises a strip or holder and a clasp member attached thereto, the said clasp member being a metal plate having a keyhole-shaped eye or holder adapted to engage the stud member of the clasp.

The invention has particular reference to the method of attaching the plate to the strip or holder. Heretofore in the manufacture of corset-steels the clasp plates or members have usually been attached to the steel strip or holder by means of independent rivets inserted in orifices both in the clasp-plate and the steel strip and upset or headed in the usual manner. This mode of connecting the two parts is necessarily slow and expensive and, moreover, results in the formation of protuberances on the opposite surfaces, caused by the upset heads of the rivets.

My invention has for its object to enable the clasp-plate and its holder to be connected without the use of rivets or other fastening devices independent of the said parts; and it consists in the improvements which I will now proceed to describe and claim.

Figure 1:
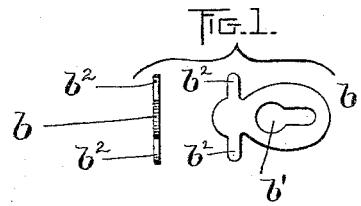
Figure 2:
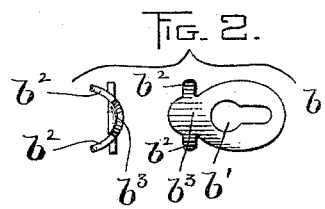
Figure 3:
Figure 4:
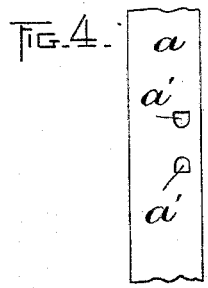
Figures 5, 6, 7:
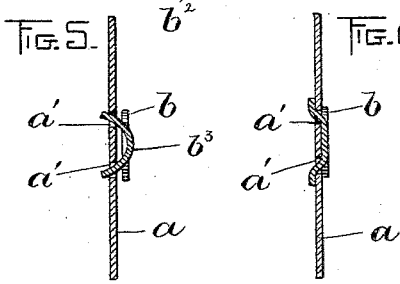
Figure 12:
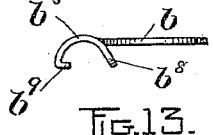
Figure 13:
Figure 14:
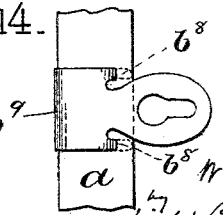

Of the accompanying drawings, forming a part of this specification, Figure 1 represents, in separate views, a side and an end view of my improved clasp member as originally struck out from a flat sheet. Fig. 2 represents, in separate views, the said member as prepared for the operation of attaching it to the strip or holder. Fig. 3 represents an edge view of the clasp-plate formed as shown in Fig. 2. Fig. 4 represents a side view of a portion of the strip or holder before the attachment of the clasp-plate thereto. Fig. 5 represents a sectional view of the strip or holder, showing the first stage of the operation of connecting the clasp-plate to it. Fig. 6 represents a view similar to Fig. 5, showing the clasp-plate attached to the strip or holder. Fig. 7 represents a side view of the strip or holder and the clasp-plate attached to it. Figs. 8, 9, 10, and 11 represent a modification. Figs. 12, 13, and 14 represent another modification.

The same letters of reference indicate the same parts in all the figures.

In the drawings, $a$ represents a strip or holder, which may be a corset-steel of the ordinary general form, said strip being provided at suitable intervals with orifices $a'\ a'$, arranged in pairs.

$b$ represents a clasp-plate, which is made of sheet-brass or other suitable material, and is provided with a keyhole-shaped orifice $b'$, adapted to engage the stud member of a clasp. The plate $b$ is provided with oppositely-projecting ears $b^2\ b^2$, which are integral with the body of the plate and are located at one end of the same. The plate $b$ is originally struck out or formed by dies from a flat sheet of metal, as shown in Fig. 1.

In preparing the plate for attachment to the strip or holder $a$ I bend the end on which the ears $b^2$ are formed, so as to give said end the shape shown in Figs. 1, 2, and 3, thus causing the ears to project diagonally in opposite directions from the body of the plate and forming an arched bridge $b^3$ between the bases or inner ends of the ears. The orifices $a^2\ a^2$ are formed and spaced so that the inclined ears $b^2$ can be inserted in them, as shown in Fig. 5, the bridge $b^3$ standing out from the outer side of the holder. I next apply pressure to the arched bridge $b^3$, tending to force the same inwardly against the outer side of the strip or holder $a$, this pressure flattening the bridge and forcing the ears outwardly, causing them to project farther through the orifices $a'$ without changing the direction in which they extend, thus avoiding sharp bends in the metal. Pressure is applied at the same time to the portions of the ears that project through the orifices, the ears being thus bent outwardly against the inner side of the strip or holder $a$, the result being that when the bridge portion $b^3$ has been flattened against the outer side of the strip or holder $a$ the inner portions of the ears will extend diagonally through the orifices $a'$ and the outer portions of the ears will bear against the inner side of the strip or holder $a$, all as indicated in Fig. 6. In this manner the clasp-plate is securely and quickly attached to the strip or holder without the use of independent fastening devices. It will be observed that there is no abrupt bending of any part of the clasp-plate, so that the operation above described is not liable to crack or fracture the metal of the clasp-plate, including the ears $b^2$.

In Figs. 8, 9, 10, and 11 I show a modification in which the plate $b$ is provided with an arched portion $b^5$, extending at right angles to the direction of the arched portions shown in the preceding figures, said arched portion being provided with ears $b^6$ $b^6$ at one side and an ear $b^7$ at the opposite side. This form of plate is attached to the strip or holder $a$ in the manner illustrated in Figs. 9, 10, and 11, the holder having three orifices $a^2$, $a^2$, and $a^3$, the orifices $a^2$ $a^2$ receiving the ears $b^6$ $b^6$, while the orifice $a^3$ receives the ear $b^7$.

Figure 8:
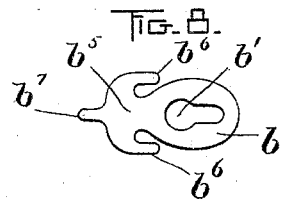
Figure 9:
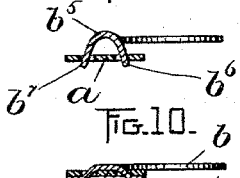
Figure 10:
Figure 11:
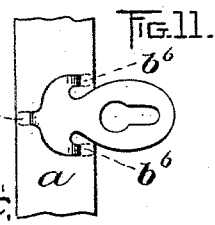

In Figs. 12, 13, and 14 I show another modification, in which the plate $b$ has an arched portion $b^5$, arranged as shown in Figs. 8, 9, and 10, one edge of said arched portion having ears $b^8$, formed and arranged like the ears $b^6$, the other edge of the arched portion being bent inwardly to form a hook $b^9$. In this case the clasp-plate is attached to the strip $a$ by engaging the hook $b^9$ with one edge of the strip and passing the ears $b^8$ $b^8$ through orifices formed in the strip, as clearly shown in Fig. 13. I prefer in all cases to give the plate $b$ and its ears such form as will enable the plate to be stamped out of sheet metal with the minimum waste. In the form shown in Fig. 1 this end is attained by narrowing the portion of the plate upon which the ears $b^2$ are formed, so that the outer ends of said ears will be separated by a space not materially longer than the width of the widest portion of the plate $b$.

The described improvements enable the plate $b$ and strip $a$ to be united by pressure between two opposed pressing-surfaces, this pressure straightening out the arched portion of the plate $b$ and causing the engagement of the ears with the strip $a$ in the manner described and shown. It is feasible to superimpose a number of strips with the clasp-plates placed in position on a press-bed and then simultaneously unite all the clasp-plates with the strip $a$ by means of pressure. It will be seen, therefore, that the operation can be much more rapidly performed than would be possible when the clasp-plates are attached by means of rivets, as heretofore.

The arched form of the portion of the clasp-plate on which the attaching-ears are formed enables the orifices in the strip or holder $a$ to be made comparatively close together, because the portion of the plate between the opposite ears is materially shortened by the arched form, the ears being disposed so that they can enter orifices placed comparatively close together. When pressure is applied to the arched portion, it assumes its original flat form, and the outer ends of the ears are thus projected beyond the orifices in which they were inserted, the whole being accomplished without fracturing the metal, so that there is no liability of the clasp-plate being pulled off from the strip or holder $a$ by the strain to which it is liable to be subjected.

I claim—

A clasp plate or member having an arched portion and inclined ears extending therefrom, whereby said ears may be passed through the orifices of a metal strip or holder and be forced outward and engaged with the opposite side of said holder by the flattening of said arched portion.

In testimony whereof I have signed my name to this specification, in the presence of two subscribing witnesses, this 30th day of March, A. D. 1897.

WM. E. HATHEWAY.

Witnesses:
CHARLES H. PEEK,
BACON WAKEMAN.